United States Patent [19]

Eichenauer et al.

[11] Patent Number: 5,131,916
[45] Date of Patent: Jul. 21, 1992

[54] COLORED FLUORESCENT POLYMER EMULSIONS FOR MARKER PENS: GRAFT COPOLYMERS AND FLUORESCENT DYES IN AQUEOUS PHASE

[75] Inventors: Herbert Eichenauer, Dormagen; Artur Haus, Overath, both of Fed. Rep. of Germany

[73] Assignee: Bayer Aktiengesellschaft, Leverkusen, Fed. Rep. of Germany

[21] Appl. No.: 660,327

[22] Filed: Feb. 22, 1991

[30] Foreign Application Priority Data

Mar. 1, 1990 [DE] Fed. Rep. of Germany ....... 4006396

[51] Int. Cl.$^5$ ............... C08J 3/03; C09D 5/22; C09D 11/16
[52] U.S. Cl. .................................. 8/527; 8/514; 8/528; 8/648; 8/919; 106/22; 252/301.34; 524/386
[58] Field of Search ............... 8/527, 528, 648, 514; 106/22; 252/301.25

[56] References Cited

U.S. PATENT DOCUMENTS

| | | | |
|---|---|---|---|
| 4,059,554 | 11/1977 | Pacansky | 524/386 |
| 4,219,438 | 8/1980 | Weston | 252/301.35 |
| 4,640,797 | 2/1987 | Goguen | 252/301.35 |
| 4,657,590 | 4/1987 | Gamblin | 106/22 |
| 4,975,220 | 12/1990 | Streitel et al. | 252/301.35 |

FOREIGN PATENT DOCUMENTS 0344379 12/1989 European Pat. Off. .

Primary Examiner—A. Lionel Clingman
Attorney, Agent, or Firm—Sprung Horn Kramer & Woods

[57] ABSTRACT

Aqueous emulsions based on certain graft polymers are outstandingly suitable for the production of colored inks for so-called marker pens. They are distinguished, for example, by a high storage stability.

9 Claims, No Drawings

COLORED FLUORESCENT POLYMER EMULSIONS FOR MARKER PENS: GRAFT COPOLYMERS AND FLUORESCENT DYES IN AQUEOUS PHASE

Colored fluorescent polymer emulsions are useful starting materials and are used on a large scale as coloring agents for various substrates such as, for example, wood, plastic, glass, metal, but preferably paper which it is intended to write on, print or otherwise mark with a fluorescent dye.

It is important here that the colored polymer emulsions contain the dye in such high concentrations that an adequate provision of color takes place even during a single coloring operation. At the same time, however, the stability of the polymer emulsion must be so high that dye does not sediment even on relatively long storage and the fluorescence of the polymer emulsion is subjected to no changes in the course of time. Furthermore, the colored polymer emulsions must have excellent film formation properties, in particular at room temperature (compare, for example, DE-OS (German Published Specification) 3,524,197), but without leading to a gumming up of the marker tips when used in marker pens.

It has now been found that these properties are attained to a particularly high extent if the polymer functioning as the disperse phase of the emulsion is a graft polymer.

The present invention thus relates to colored fluorescent polymer emulsions which contain, dispersed and/or dissolved in the aqueous phase, A) at least one graft polymer,
B) at least one fluorescent dye and if appropriate
C) at least one water-miscible organic solvent.

The invention further relates to a process for the preparation of these colored fluorescent polymer emulsions, according to which at least one fluorescent dye B) and, if appropriate, at least one water-miscible organic solvent C) is added to at least one graft polymer A) present in aqueous emulsion with continuous stirring at temperatures between 20° C. and 100° C., preferably between 50° C. and 100° C., until the emulsion is uniformly colored.

Preferred graft polymers A are reaction products of ethylenically unsaturated monomers which are capable of the preparation of homopolymers having glass transition temperatures of at least 30° C. and serve as grafting monomers for the preparation of the graft support, and a rubber-like polymer having a glass transition temperature of at most 10° C., preferably at most 0° C. Preferred graft polymers A include those graft polymers which are essentially obtainable from at least 2 of the following monomers:

chloroprene, 1,3-butadiene, isoprene, styrene, acrylonitrile, ethylene, propylene, vinyl acetate and (meth)-acrylic acid esters having 1 to 18 C atoms in the alcohol component; i.e. polymers, such as are described, for example, in "Methoden der Organischen Chemie" [Methods of Organic Chemistry] (Houben-Weyl), Vol. 14/1, Georg Thieme Verlag, Stuttgart 1961, pp. 393–406 and in C. B. Bucknall, "Toughened Plastics", Appl. Science Publishers, London 1977.

In the preparation of the graft polymers A by graft copolymerization, which is customarily carried out in the presence of free radical initiators, for example, water-soluble initiators, emulsifiers or complexing agents/graft activators and regulators, free homo- or copolymers of the graft monomers forming the graft covering are in general also formed to a certain extent in addition to the actual graft copolymer. Graft polymers A in the sense of the invention are therefore products obtained by polymerization of graft monomers in the presence of the rubber latex, stated precisely i.e. in general a mixture of graft copolymer and free (co)-polymer of the graft monomers.

Preferably, the amount of free (co-)polymer does not exceed 15% by weight, preferably 10% by weight, in particular 7% by weight, relative to component A. The Staudinger index of these free (co)polymers should be less than 0.6 dl/g, preferably less than 0.4 dl/g, measured in dimethylformamide at 25° C.

Preferred graft bases for the preparation of the graft polymers A include diene and acrylate rubbers, and in addition also ethylene/propylene copolymers, EPDM rubbers (=ethylene/propylene/diene copolymers) and silicone rubbers. The graft bases are preferably at least partially cross-linked.

Preferred diene rubbers are cross-linked homo- and/or copolymers of conjugated $C_4$–$C_6$ dienes. Preferred dienes are 1,3-butadiene and isoprene. The diene copolymers can contain up to 30% by weight, relative to the diene copolymer, of radicals of other ethylenically unsaturated monomers, such as, for example, styrene, acrylonitrile, esters of acrylic or methacrylic acid with monohydric $C_1$–$C_4$-alcohols, such as, for example, methyl acrylate, ethyl acrylate, methyl methacrylate and ethyl methacrylate in addition to the diene radicals. The preferred graft base is polybutadiene.

The preparation of the diene rubber-graft base and the graft polymers prepared therefrom is described, for example, in "Methoden der Organischen Chemie" [Methods of Organic Chemistry] (Houben-Weyl), Vol. 14/1, Georg Thieme Verlag, Stuttgart 1961, pp. 393–406, and in Ullmanns Encyclopädie der technischen Chemie [Ullmann's Encyclopedia of Industrial Chemistry], 4th edition, Vol. 19, Verlag Chemie, Weinheim, 1981, pp. 279 to 284.

The gel content of the diene rubbers used as graft base is preferably over 50, in particular over 70% by weight, determined in toluene at 25° C. (compare M. Hoffmann, H. Krömer and R. Kuhn, Polymeranalytik I und II [Polymer analysis I and II], Georg Thieme Verlag, Stuttgart 1977).

Preferred graft bases based on acrylate rubber are polymers which are obtained by polymerization of $C_1$–$C_8$-alkyl acrylates. The polymers can also be copolymers of acrylic acid esters containing up to 40% by weight, relative to the copolymer, of other vinyl monomers, such as styrene, acrylonitrile, methyl methacrylate, vinyl esters or vinyl ethers.

The gel content of the acrylate rubbers used as graft base is preferably over 40, in particular over 60% by weight, determined in dimethylformamide at 25° C. (compare M. Hoffmann, H. Krömer, R. Kuhn, loc. cit.).

The at least partial cross-linking of the graft bases can be carried out by the concomitant use of the crosslinking monomers in the preparation of the graft bases. Suitable cross-linking monomers are compounds containing at least 2 ethylenically unsaturated copolymerizable double bonds.

Preferred examples of cross-linking monomers containing more than one copolymerizable double bond are esters of unsaturated $C_3$–$C_{12}$-monocarboxylic acids and unsaturated monohydric $C_2$–$C_{12}$-alcohols or saturated $C_2-C_{20}$-polyols containing 2 to 4 OH groups, such as, for example, polyunsaturated heterocyclic compounds, such as trivinyl and triallyl cyanurate and isocyanurate; in particular triallyl cyanurate; polyfunctional vinyl compounds, such as di- and trivinylbenzenes; but also triallyl phosphate.

Preferred cross-linking monomers are allyl methacrylate, ethylene glycol dimethacrylate, diallyl phthalate and heterocyclic compounds which contain at least three copolymerizable ethylenically unsaturated double bonds.

Particularly preferred cross-linking monomers are the cyclic monomers triallyl cyanurate, triallyl isocyanurate, trivinyl cyanurate, trisacryloylhexahydro-s-triazine and triallylbenzenes.

The amount of the cross-linking monomers is preferably 0.02 to 5, in particular 0.05 to 2% by weight, relative to the rubber graft base.

In the case of cyclic, cross-linking monomers containing at least three ethylenically unsaturated double bonds, it is advantageous to use not more than 1% by weight, relative to the rubber graft base.

Preferred copolymerizable grafting monomers, which can react with the graft base to give the graft polymer, include, for example, styrene, α-methylstyrene, ring-substituted styrene, methyl methacrylate, acrylonitrile, methacrylonitrile, N-substituted maleimide, vinyl acetate, acrylic acid, methacrylic acid, hydroxyethyl acrylate, hydroxyethyl methacrylate, glycidyl methacrylate, dimethylaminoethyl acrylate, dimethylaminoethyl methacylate and mixtures thereof.

Preferred graft polymers A are reaction products of 40 to 99, preferably 65 to 97.5, in particular 75 to 95% by weight of graft monomer on 1 to 60, preferably 2.5 to 35, in particular 5 to 25% by weight of graft base, in each case relative to graft rubber A.

Particularly preferred graft polymers A are reaction products of

A1) 10–200 parts by weight, preferably 50–150 parts by weight, of styrene, α-methylstyrene, styrene which is ring-substituted by Cl or $C_1-C_4$-alkyl, methyl methacrylate, acrylonitrile, methacrylonitrile, $NC_1-C_4$-alkyl- or N-phenyl-substituted maleimide, vinyl acetate or mixtures thereof and/or A2) 1–20 parts by weight, preferably 2.5–15 parts by weight, of acrylic acid, methacrylic acid, hydroxyethyl acrylate, hydroxyethyl methacrylate, glycidyl methacrylate, dimethylaminoethyl acrylate, dimethylaminoethyl methacrylate or mixtures thereof on A3) 1–50 parts by weight, preferably 5–25 parts by weight, of a graft base having a glass temperature $\leq 10°$ C., preferably $\leq 0°$ C.

Methyl methacrylate, styrene or mixtures of styrene and acrylonitrile, preferably in the weight ratio 90:10–70:30, are preferably employed as the monomer component A1) and the preferred monomer component A2) is acrylic acid and/or methacrylic acid; the resulting graft polymers have glass transition temperatures $\geq 30°$ C., preferably $\geq 50°$ C.

The graft polymers A can be prepared by free radical emulsion graft reaction of the graft monomers in the presence of the graft base present in latex form, at temperatures between 25° and 160°, preferably 40° and 90° C.

Preferred grafted diene rubbers are described, for example, in DE-PS (German Patent Specification) 2,348,377 and in DE-OS (German Published Specification) 2,927,576 or 3,025,605, and preferred grafted acrylate rubbers, for example, in DE-PS (German Patent Specification) 2,444,584 and in DE-OS (German Published Specification) 2,726,256, 3,039,114, 3,039,115 or 3,117,052.

Preferred graft polymers A have average particle diameters $d_{50}$ of 0.05 to 2, preferably of 0.08 to 1.5, in particular of 0.1 to 0.8 μm.

The average particle diameter $d_{50}$ is the diameter above and beneath which 50% by weight of the particles in each case lie. It can be determined by means of ultracentrifuge measurements (W. Scholtan and H. Lange, Kolloid. Z. und Z. Polymere 250 (1972), 782–796) or by means of electron microscopy and subsequent particle counting (G. Kämpf and H. Schuster, Angew. Makromolekulare Chemie 14, (1970), 111–129) or by means of light scattering measurements.

Customary emulsifiers such as, for example, alkyl sulphates, alkylsulphonates, soaps of saturated or unsaturated fatty acids and alkali-disproportionated or hydrogenated abietic or tall oil acids can be used in the graft polymerization.

Non-ionic emulsifiers such as, for example, polyethoxylated or polypropoxylated alcohols, for example polyethoxylated nonylphenol or polyethoxylated oleyl alcohol, can be employed in addition to these; polyethoxylated carboxylic acids such as, for example, polyether esters of oleic acid or abietic acid and ethylene oxide are also highly suitable.

Suitable initiators are inorganic and organic peroxides, for example $H_2O_2$, di-tert.-butyl peroxide, cumene hydroperoxide, dicyclohexyl percarbonate, p-menthane hydroperoxide, azo initiators such as, for example, azobisisobutyronitrile, inorganic per salts such as potassium persulphate, ammonium persulphate, potassium perphosphate, sodium perborate and redox systems which are composed of an—as a rule organic—oxidizing agent and a reducing agent, heavy metal ions additionally being present in the reaction medium (see H. Logemann in Houben-Weyl, Methoden der organischen Chemie [Methods of organic Chemistry], Vol. 14/1, pp. 263–297).

The graft polymerization is preferably carried out while adding the monomers in portions or continuously to the rubber component present in latex form, but it can also be carried out by the so-called "batch method" with the combined addition of all reaction components.

Possible fluorescent dyes B) which can be employed according to the invention are compounds of all types of classes of substance, such as, for example, those of the azo-, methine-, triphenylmethane-, coumarin-, anthraquinone-, phthalocyanine- and perylenetetracarboxylic acid diimide series.

The dyes or brighteners can be anionic, cationic or, preferably, non-ionic.

3-Benzoxazolyl-7-amino-coumarins according to DOS (German Published Specification) 2,030,507 and aryloxystyryl dyes according to DE-OS (German Published Specification) 2,316,766 are particularly preferred. 3-Benzimidazolium-7-aminocoumarins according to DOS (German Published Specification) 1,098,125, anthrapyrimidines according to DOS (German Published Specification) 3,001,188 and EP-A-32,373, benzanthrones according to DOS (German Published Specification) 2,617,322, benzoxanthenes according to DOS (German Published Specification) 2,922,374 and 4-cyanocoumarins according to US-A-4,547,579 and DOS (German Published Specification) 2,925,546 are additionally suitable.

Very particularly suitable dyes are those of the formulae

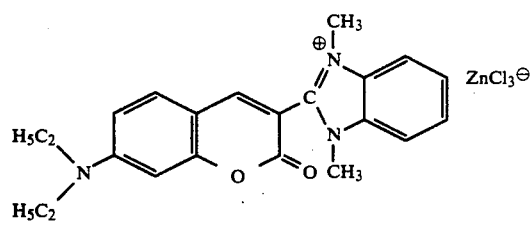

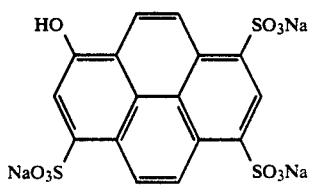

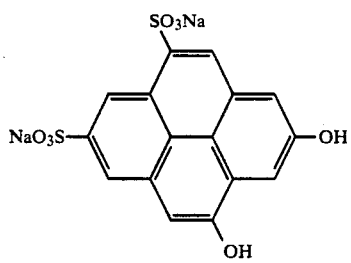

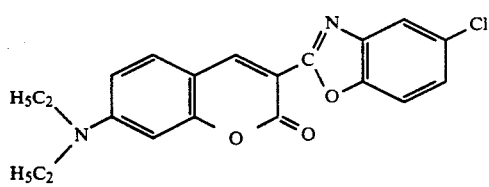

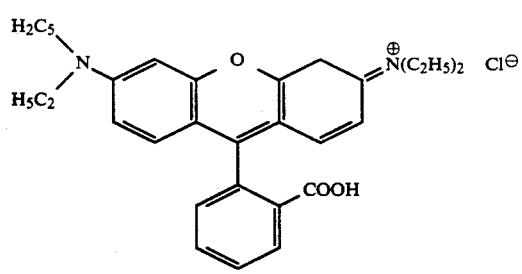

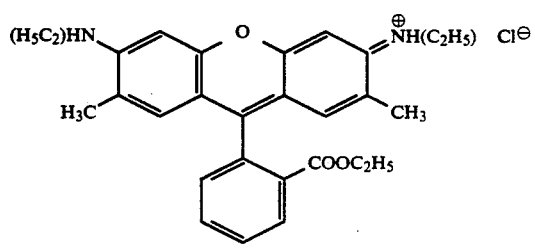

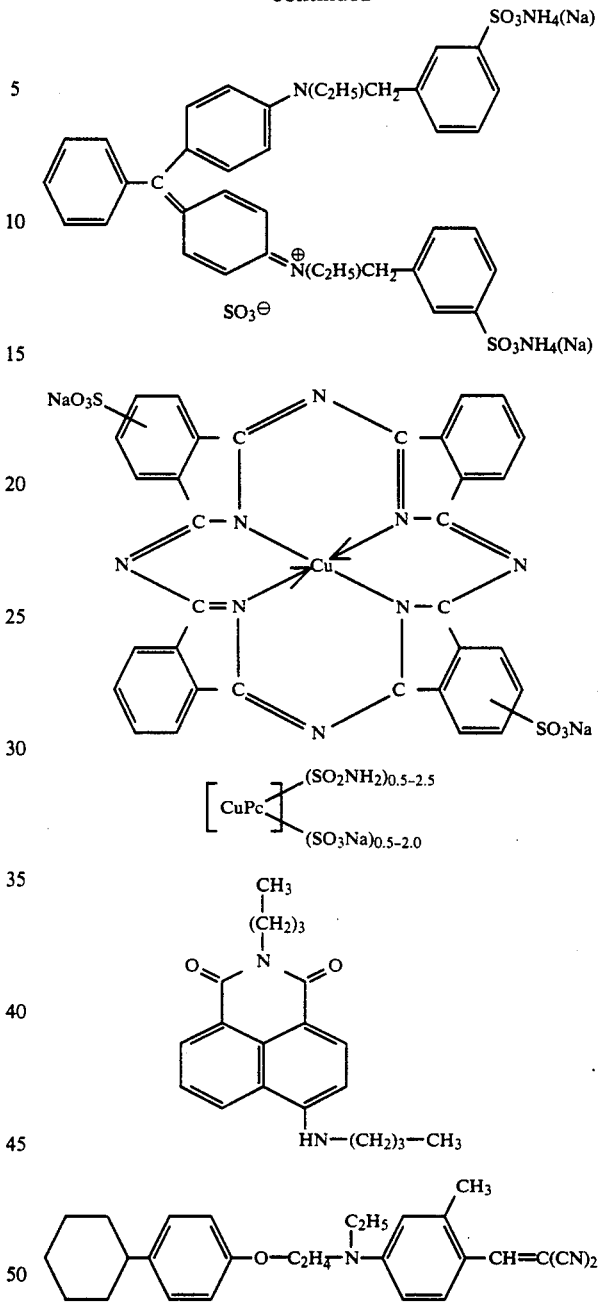

For the purpose of shading, dye mixtures can also be employed. In principle, the addition of special pigments is also possible.

Water-miscible organic solvents C) which can be employed if appropriate are, for example, ethylene glycol, propylene glycol, diethylene glycol, butanediol, glycerol, polyglycols and ethoxypropanol.

The coloring of the polymer emulsion can be carried out, for example, by addition of an aqueous solution of the dye B) or a combination of water, water-miscible organic solvent C) and dye B) to the polymer emulsion A). In principle, coloring is also possible by the dye B) being present in the emulsion polymerization system for the preparation of the graft polymer A).

The preparation of the colored fluorescent polymer emulsions is preferably carried out by adding a fluorescent dye B) and, if appropriate, a water-miscible organic solvent C) to the graft polymer A) present in emulsion form with continuous stirring at temperatures between 20° C. and 100° C., and continuing the stirring process until the emulsion is uniformly colored.

The solid contents of the colored fluorescent polymer emulsions according to the invention are variable within wide ranges and can be suited to the particular requirements, in general they are between 2 and 60% by weight, preferably between 5 and 50% by weight.

The colored fluorescent polymer emulsions according to the invention can be used directly for coloring, but they can also be used after additives customary for aqueous dyeing (for example for adjusting the viscosity, the drying properties or for protection against bacterial or fungal attack) have been added. In principle, the addition of antioxidants, for example of sterically hindered phenols (for example 2,6-di-tert.-butyl-p-cresol or octadecyl 3-(3,5-di-tert.-butyl-4-hydroxyphenyl)propionate) is also possible.

The preferred field of use for the colored fluorescent polymer emulsions according to the invention is the use as a base for the production of marker inks.

EXAMPLE 1

Preparation of a Graft Polymer A)

10 parts by weight of a polybutadiene (in the form of an aqueous latex having a solids content of 7.6% by weight) having an average particle diameter ($d_{50}$) of 0.1 μm are warmed to 65° C. in a reactor, after which 0.5 part by weight of potassium persulphate (dissolved in 10 parts by weight of water) is added. 8 parts by weight of sodium salt of $C_{9-18}$-alkylsulphonic acids (for example Mersolat ® K 30 from Bayer AG) are then added, after which 90 parts by weight of a monomer mixture of 70% by weight of styrene, 24.4% by weight of acrylonitrile and 5.6%. by weight of methacrylic acid are metered in the course of 4 hours, in the course of which the graft reaction takes place. After a post-reaction time of a further 4 hours at 65° C., the graft reaction is terminated. A graft polymer having a polymer solids content of 41.6% by weight results.

EXAMPLE 2

Preparation of a Graft Polymer A)

7.5 parts by weight of a polybutadiene (in the form of an aqueous latex having a solids content of 7.6% by weight) having an average particle diameter ($d_{50}$) of 0.12 μm are warmed to 65° C. in a reactor, after which 0.5 part by weight of ammonium persulphate (dissolved in 20 parts by weight of water) is added. After addition of a mixture of 8 parts by weight of sodium salt of $C_{9-18}$-alkylsulphonic acids (Mersolat K 30 from Bayer AG) and 2 parts by weight of the sodium salt of n-dodecyl-benzenesulphonic acid (Marlon A 375 from Chemische Werke Hüls), 92.5 parts by weight of a monomer mixture of 45.95% by weight of styrene, 45.95% by weight of methyl methacrylate and 8.1% by weight of acrylic acid are metered in the course of 4 hours, in the course of which the graft reaction takes place. After a post-reaction time of a further 4 hours at 65° C., the graft reaction is complete. A graft polymer latex having a polymer solids content of 45.0% by weight results.

EXAMPLE 3 (Comparison)

The polymerization described in Experiment 1 is repeated, the amount of polybutadiene latex being replaced by water. A latex having a polymer solids content of 37.3% by weight results.

EXAMPLE 4

Preparation of a Fluorescent Polymer Emulsion 100 parts by weight of water are added to and mixed with 150 parts by weight of the graft polymer latex from Example 1, whereupon a latex having a polymer solids content of about 25% by weight results. A mixture of 30 parts by weight of water, 50 parts by weight of ethylene glycol, 1.35 parts by weight of the yellow fluorescent dye of the formula

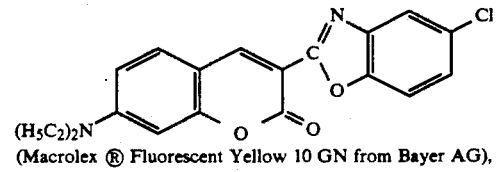

(Macrolex ® Fluorescent Yellow 10 GN from Bayer AG), 0 5 part by weight of a non-ionic emulsifier of the type of a nonylphenol reacted with 10 mol of EO and 1.5 parts by weight of sodium salt of $C_{9-18}$-alkylsulphonic acids is added to this latex with stirring, and the mixture is heated to 90°–95° C. and stirred at this temperature for 4 hours.

EXAMPLE 5

Preparation of a Fluorescent Polymer Emulsion 130 parts by weight of the graft polymer latex from Example 2 are diluted with 100 parts by weight of water, whereupon a latex having a polymer solids content of about 25% by weight is obtained. A mixture of 20 parts by weight of water, 30 parts by weight of propylene glycol, 30 parts by weight of glycerol, 1.4 parts by weight of the yellow fluorescent dye of the formula indicated in Example 4 and 2.0 parts by weight of a non-ionic emulsifier (NP 10 from Bayer AG) is added to this latex with stirring, and the mixture is heated to 90°–95° C. and stirred at this temperature for 4 hours.

Similar colorings are also possible using the yellow fluorescent dye of the formula

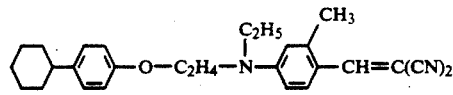

EXAMPLE 6

Preparation of a Colored Fluorescent Polymer Emulsion Not According to the Invention (Comparison)

100 parts by weight of water are added to 200 parts by weight of the latex from Example 3, whereupon a latex having a polymer solids content of about 25% by weight results. A mixture of 30 parts by weight of water, 50 parts by weight of ethylene glycol, 1.35 parts by weight of Macrolex Fluorescent Yellow 10 GN from Bayer AG, 0.5 part by weight of a non-ionic emulsifier (see Example 4) and 1.5 parts by weight of sodium salt of $C_{9-18}$-alkylsulphonic acids (see Example 1) is added to this with stirring, and the mixture is heated to 90°–95° C. and stirred at this temperature for 4 hours.

Investigations on the Colored Fluorescent Polymer Emulsions Obtained

A) Evaluation of the stability of the emulsions

Directly after preparation, samples of the polymer emulsions according to the invention described in Examples 4 and 5 and the comparison emulsion described in Example 6 were made up to 100 g of emulsion in each case and filtered through a filter having a mesh width of 100 μm after different lengths of time, after which the amounts of solid remaining on the filter were dried and weighed.

| Storage time | Solid remaining on the filter (g) | | |
|---|---|---|---|
| | Emulsion from Example 4 | Emulsion from Example 5 | Emulsion from Example (6) (Comparison) |
| 1 day | — | — | — |
| 1 week | — | 0.01 | 0.08 |
| 4 weeks | 0.01 | 0.02 | 0.24 |

B) Evaluation of the fluorescence of the emulsions after storage for different lengths of time Using the polymer emulsions according to the invention described in Examples 4 and 5 and the comparison emulsion described in Example 6, lines were drawn on paper after different lengths of time, after which the fluorescence resulting in each case was evaluated visually. The evaluation was carried out according to the following scale:

1: strong fluorescence
2: medium fluorescence
3: weak fluorescence
4: no fluorescence

| Storage time | Evaluation of the fluorescence according to the above scale | | |
|---|---|---|---|
| | Emulsion from Example 4 | Emulsion from Example 5 | Emulsion from Example 6 (Comparison) |
| 1 day | 1 | 1 | 1 |
| 1 week | 1 | 1 | 2 |
| 4 weeks | 1 | 1 | 3 |

Similar results are obtained with the dye of the formula

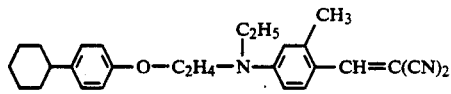

EXAMPLE 7

Preparation of a Fluorescent Polymer Emulsion 100 parts by weight of water are added to and mixed with 150 parts by weight of the graft polymer latex from Example 1, whereupon a latex having a polymer solids content of about 25% by weight results. A mixture of 30 parts by weight of water, 50 parts by weight of glycerol, 1.0 part by weight of a non-ionic emulsifier of the type of an oleyl alcohol reacted with 19 mol of EO, 0.5 part by weight of a non-ionic emulsifier of the type of a nonylphenol reacted with 10 mol of EO, 1.5 parts by weight of sodium salt of $C_{9-18}$-alkylsulphonic acids and 1.35 parts by weight of the yellow fluorescent dye of the formula

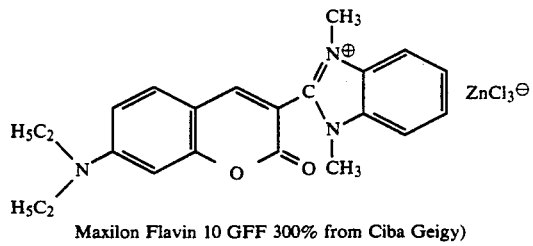

Maxilon Flavin 10 GFF 300% from Ciba Geigy)

is added to this latex with stirring, and the mixture is heated to 90° C. and stirred at this temperature for 2.5 hours.

EXAMPLE 8

Preparation of a Fluorescent Polymer Emulsion

Example 7 was repeated, a reddish violet dye of the formula

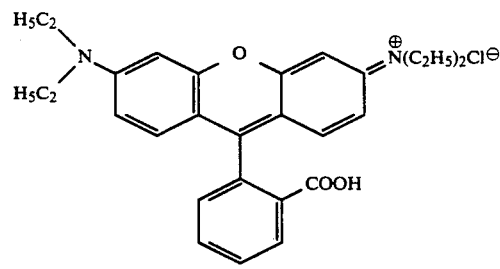

(Basonyl Red 540 from BASF AG)

being employed instead of the yellow fluorescent dye. A stable fluorescent reddish violet polymer emulsion resulted.

EXAMPLE 9

Preparation of a Fluorescent Polymer Emulsion

Example 7 was repeated, another yellow fluorescent dye of the formula

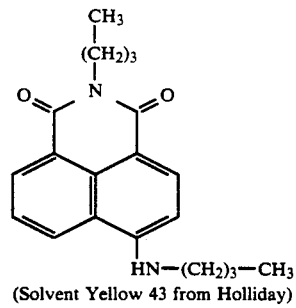

(Solvent Yellow 43 from Holliday)

being employed. A stable fluorescent polymer emulsion also resulted here.

We claim:

1. Colored fluorescent polymer emulsions, which contain a non-aqueous phase dispersed or dissolved in an aqueous phase, the non-aqueous phase comprising:
A) at least one graft polymer of styrene, methyl methacrylate, acrylonitrile, vinyl acetate, acrylic acid, methacrylic acid, or mixtures thereof on a graft base of diene rubber, an acrylate rubber, ethylene/propylene copolymers, ethylene/propylene/diene copolymers, or silicone rubbers; and B) at least one fluorescent dye from the azo-, methine-, triphenylmethane-, coumarin-, anthraquinone-, phthalocyanine-, and perylenetetracarboxylic acid diimide series.

2. Colored fluorescent polymer emulsions according to claim 1, wherein the raft polymer in A) is obtained by reacting A1) 10–200 parts by weight of styrene, α-methylstyrene, styrene which is ring-substituted by Cl or $C_{1-4}$-alkyl, methyl methacrylate, acrylonitrile, methacrylonitrile, N-$C_{1-4}$-alkyl- or N-phenyl-substituted maleimide, vinyl acetate, or mixtures thereof and/or A2) 1–20 parts by weight of acrylic acid, methacrylic acid, hydroxyethyl acrylate, hydroxyethyl methacrylate, glycidyl methacrylate, dimethylaminoethyl acrylate, dimethylaminoethylmethacrylate, or mixtures thereof on the graft base.

3. Colored fluorescent polymer emulsions according to claim 1, characterized in that the graft base of polymer A is a diene rubber or an acrylate rubber.

4. Colored fluorescent polymer emulsions according to claim 1, wherein the non-aqueous phase further comprises at least one water-miscible solvent, the water-miscible solvent being selected from the group consisting of ethylene glycol, propylene glycol, diethylene glycol, butanediol, glycerol, polyglycols and ethoxypropanol.

5. Colored fluorescent polymer emulsions according to claim 1, characterized int hat a dye of the formula

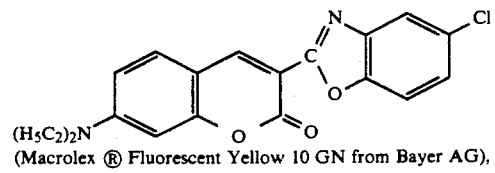

(Macrolex ® Fluorescent Yellow 10 GN from Bayer AG), is present as component B).

6. Colored fluorescent polymer emulsions according to claim 1, characterized in that a dye of the formula

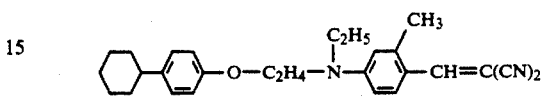

is present as component B).

7. Process for the preparation of colored fluorescent emulsions according to claim 1, comprising dispersing or dissolving the graft polymer in A) in the aqueous phase, then adding the fluorescent dye in B) to the aqueous phase containing the graft polymer, and then continuously stirring the aqueous phase containing the graft polymer and the fluorescent dye at temperatures between 20°–100° C. until a uniformly colored emulsion is formed.

8. Process according to claim 7, further comprising adding at least one water-miscible solvent to the aqueous phase containing the graft polymer prior to stirring, the water-miscible solvent being selected from the group consisting of ethylene glycol, propylene glycol, diethylene glycol, butanediol, glycerol, polyglycols and ethoxypropanol.

9. Marker pens containing at least one polymer emulsions according to claim 1.

* * * * *

UNITED STATES PATENT AND TRADEMARK OFFICE
CERTIFICATE OF CORRECTION

PATENT NO. : 5,131,916

DATED : July 21, 1992

INVENTOR(S) : Eichenauer et al.

It is certified that error appears in the above-indentified patent and that said Letters Patent is hereby corrected as shown below:

Col. 11, line 7, delete "raft" and substitute --graft--

Col. 11, line 37, delete "int hat" and substitute --in that--

Signed and Sealed this

Fourteenth Day of December, 1993

*Attest:*

BRUCE LEHMAN

*Attesting Officer*     *Commissioner of Patents and Trademarks*